July 23, 1929.  J. PRENTICE  1,722,058
STEAM BOILER AND BLOW-OFF DEVICE THEREFOR
Filed April 10, 1926   2 Sheets-Sheet 1

INVENTOR
John Prentice
BY
ATTORNEYS

July 23, 1929.  J. PRENTICE  1,722,058
STEAM BOILER AND BLOW-OFF DEVICE THEREFOR
Filed April 10, 1926   2 Sheets-Sheet 2
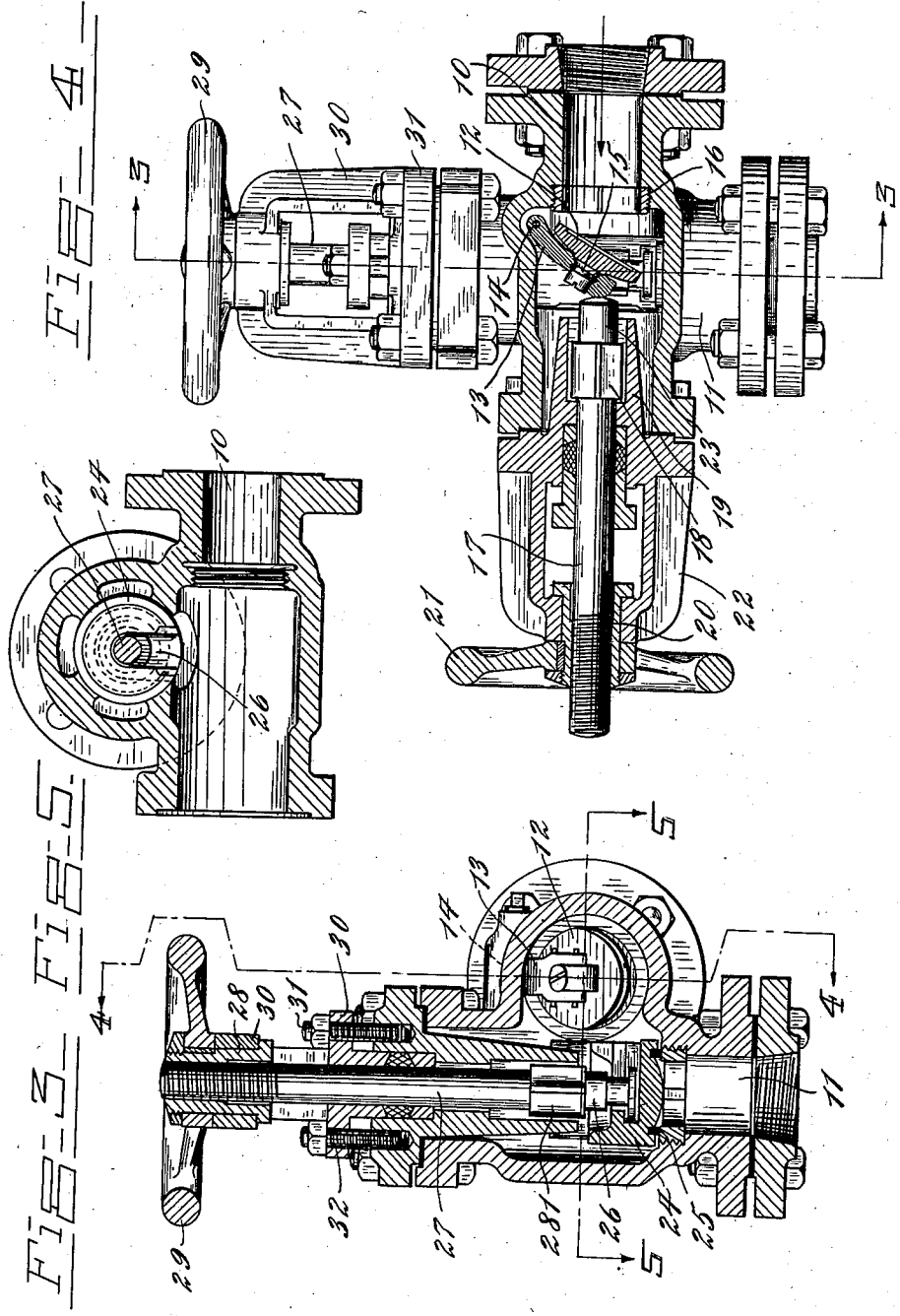
INVENTOR
John Prentice
BY
ATTORNEYS Patented July 23, 1929.

1,722,058

UNITED STATES PATENT OFFICE.

JOHN PRENTICE, OF BAYONNE, NEW JERSEY, ASSIGNOR TO THE BABCOCK & WILCOX COMPANY, OF BAYONNE, NEW JERSEY, A CORPORATION OF NEW JERSEY.

STEAM BOILER AND BLOW-OFF DEVICE THEREFOR.

Application filed April 10, 1926. Serial No. 101,020.

Figure 1:
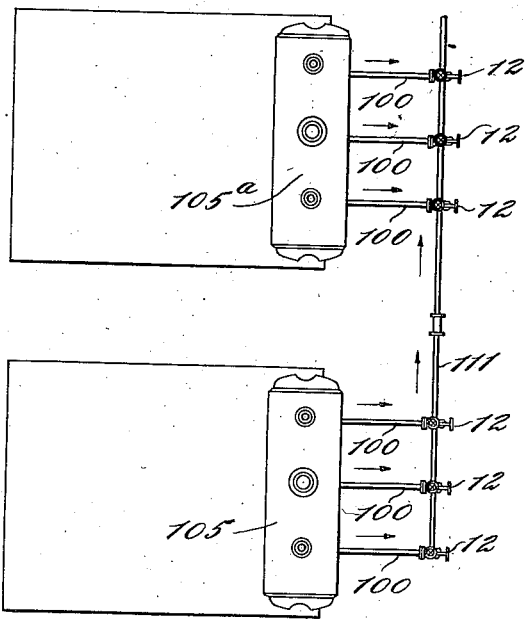
Figure 2:
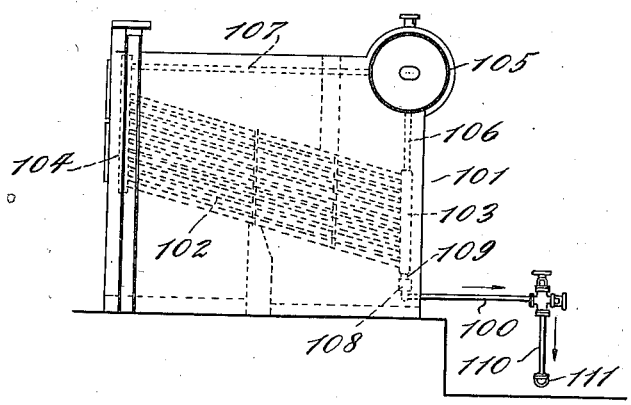

My present invention relates to a steam boiler installation, and more particularly to an installation in which a plurality of boilers, each of which preferably includes a drum, are connected to a common blow-off main, and which will best be understood from the following description and the appended drawings in which Fig. 1 is a plan view of a steam boiler installation comprising two mud drums which are connected to steam and water drums and which are connected to a common blow-off main; Fig. 2 is an end view of Fig. 1; Fig. 3 is a sectional elevation on the line 3—3 of Fig. 4 illustrating an embodiment of the valve device through which one of the drums is connected to the common blow-off main; Fig. 4 is a section on the line 4—4 of Fig. 3, and Fig. 5 is a section on line 5—5 of Fig. 3.

Like reference characters indicate like parts in the several views.

Referring to the drawings, in which I have illustrated a preferred form of my blow-off system, the valve has a body member with an inlet 10 and an outlet duct 11 formed therein, these ducts communicating with each other and extending at right-angles to each other through the body of the valve. The inlet 10 for the valve communicates by means of a pipe 100 with a steam boiler indicated generally at 101 and which is here shown as comprising a plurality of horizontally extending boiler tubes 102 connected at their ends to respective downtake and uptake headers 103 and 104 which are in turn connected to steam and water drums 105 and 105ª through suitable connections 106 and 107. In the illustrative embodiment, three pipes 100 lead from the respective valve inlets to a mud drum 108 connected to the downtake headers 103 by nipples 109. The outlets 11 for the valves communicate by pipes 110 with a common blow-off main 111. Placing the ducts and the valves at right angles to each other enables the valves to be set closer together than would be possible should they be set parallel to each other, and provides an arrangement that is particularly adaptable for use with a single body member. Placing the valves at right angles to each other makes the hand wheels come in positions where one will not interfere with the other in opening and closing the valves. In the arrangement shown the valves are set so close together that the hand wheels would overlap if an attempt were made to place the spindles side by side and parallel to each other. It is, therefore, possible when the valves are placed at right angles to each other to provide a more substantial and cheaper arrangement than could be secured by making them come parallel and one that will be more handy to operate. In the inlet duct 10, in the illustrative form, I provide a check valve having the valve proper 12 mounted on a swinging arm 13, pivoted in the body portion at 14. The valve 12 is preferably free to rotate in the swinging member 13, being held in place by a pin or pins 15 extending into the groove turned in the neck of the valve 12. A valve seat 16 of a more durable metal may be provided for the valve 12.

Extending in line with the axis of the inlet duct 10 is a valve stem 17, which, in the form illustrated, is non-rotatable, being held against rotation by a polygonal form 18 engaging a correspondingly shaped recess in the valve bonnet member 19. The valve stem 17 is moved longitudinally in the form illustrated, by a nut 20 operated by a hand-wheel 21, the nut 20 engaging a threaded portion of the stem 17. The stem 17 is provided with the usual gland. The nut 20 has shoulders engaging with bearing surfaces on the extension piece 22 of the valve bonnet.

The inner end 23 of the stem 17 abuts against the outer surface of the swinging member 13, and when the hand-wheel 21 is turned to move the stem 17 to the right of Fig. 4, the end 23 by its contact with the swinging member 13 will press the valve 12 against the seat 16, holding it against the pressure of fluid flowing into the inlet port of the inlet duct 10.

In the outlet duct 11 is a valve 24 cooperating with a valve seat 25, the valve 24 having a slotted engagement with the end 26 of a valve stem 27 provided with a polygonal portion 281 similar to that of the valve stem 17. This valve stem 27 also has a nut 28 to which is connected a hand-wheel 29, the nut 28 being held in the upper part of a frame 30 constituting an extension of the valve bonnet, and the valve stem 27 is also provided with the usual gland and packing. The valve 24 is held on the seat 25 by the pressure of the valve stem 27, and moreover moves to close the valve in the direction of the flow of fluid from the inlet port of the outlet duct of the valve.

The inlet duct and the outlet duct of the valve intersect each other at approximately the middle of the valve body so that as the fluid flows through the inlet duct 10 and past the valve 12, it then flows into the space around the valve 24, and if that valve be open, out of the outlet duct 11.

With the arrangement illustrated, I am enabled to provide two valves both of which must be open in order to permit fluid to pass from the inlet to the outlet port and which at the same time, has only a single point of attachment to the steam boiler from which fluid is to be withdrawn.

In the operation of the blow-off system illustrated, both of the valves will be normally closed, the valve 12 being held against the boiler pressure by the stem 17, and the valve 24 being held on its seat by the valve stem engaged therewith and also by any pressure from the boiler which might leak past the valve 12. In order to permit fluid to pass the valve, as in blowing down the boiler, the stem 17 is first moved to permit the check valve 12 to swing open. As soon as the valve is even partially open, the pressure around the valve becomes balanced, so that there is little or no wear on the nut and the parts associated with the valve stem in this opening movement. Now, the wheel 29 may be turned to lift the valve 24 from its seat and permit whatever blow-off may be desired. The valves may be closed in a reverse manner. The valve 24 is first brought down on its seat, being aided in this movement by the pressure of the fluid flowing through the valve. As soon as the valve 24 is closed, the pressure in the chamber around the valve 12 becomes a balanced one, and the valve may be brought to its seat with substantially no work on the valve stem.

By forming the valve 12 as a check valve which is capable of being closed independently of the valve stem 17, I provide an arrangement which will prevent backward flow of fluid through the valve from the outlet duct 11 to the inlet duct 10. This arrangement of the valve is very important when used for blowing off steam boilers as illustrated. It frequently happens that the blow-off valves of a number of boilers are connected to a common outlet main. With such a system, when the ordinary valve arrangement is in use, and when workmen are in one of the boilers and the other boiler is being blown down, then if the workmen should fail to close the valves connecting the boiler, in which the workmen are located, to the main, and the steam and water were prevented from passing out of the main, such steam and water would be free to back up into the boiler in which the workmen are engaged, which might, of course, result in fatal injury. By the provision of the valve device including the check valve 12 which is operable independent of the exterior control the foregoing results are not possible, since any fluid flowing into the outlet opening 11 from the common main will close the check valve and prevent the fluid passing into the boiler in which workmen are engaged. If, for example, a steam boiler having a steam and water drum 105 were being blown down and workmen were located in another boiler having a steam and water drum 105$^a$, it would be impossible for steam and water from the common main 111 to back up through the valves connecting the common main to the steam and water drum 105$^a$.

While, preferably, I place the valve which opens with the pressure in the inlet duct and the valve closing with the pressure in the outlet duct, these positions may be reversed.

In order to minimize the required height for the valve bonnet, I preferably arrange the holding screws 31 so that they may pass into threaded openings 32 formed in the flange of the valve body.

My present application is a continuation in part of my application Serial No. 577,336, for valves, which was filed in the Patent Office on or about July 25, 1922.

I claim:

1. In a steam boiler installation, a plurality of boilers, a common blow-off main for said boilers, and connections between the bottom portion of each of said boilers and said blow-off main, each of said connections including two valves controllable from the exterior, one of the valves being a check valve opening in the direction of pressure from the associated boiler and closing in the direction of pressure from the common blow-off main, said check valve being free to close independently of the exterior control, and the other valve opening against the pressure from the associated boiler.

2. In a steam boiler installation, a plurality of boilers, a common blow-off main for said boilers, and connections between the bottom portion of each of said boilers and said blow-off main, each of said connections including two valves controllable from the exterior, the valve nearest the inlet port being a check valve opening in the direction of pressure from the inlet port and closing in the direction of pressure from the blow-off main, the said check valve being free to close independently of the exterior control, and the other valve opening against the pressure from the associated boiler.

3. In a steam boiler installation, a plurality of boilers, a common blow-off main for said boilers, and connections between the bottom portion of each of said boilers and said blow-off main each comprising a valve body having an inlet and an outlet port, said body being provided with a passage leading from said inlet to said outlet port, and a pair of valves in said body in series between the ports and controllable from the exterior, one of said valves opening in the direction of pressure from the associated boiler and closing automatically when the pressure is reversed and the other against the pressure from said boiler, the direction of opening of said valves being substantially at right angles to each other.

4. In a steam boiler installation, a plurality of boilers, a common blow-off main for said boilers, and connections between the bottom portion of each of said boilers and said blow-off main each comprising a valve body having an inlet and an outlet port, said body being provided with a passage leading from said inlet to said outlet port, and a pair of valves in said body in series between the ports and controllable from the exterior, the valve nearest the inlet port being a check valve operable with the pressure from the inlet port and against the pressure from the blow-off main, valve stems operable from the exterior to control each of said valves, the stem for the check valve being unattached thereto and arranged normally to hold it on its seat.

JOHN PRENTICE.